US010787934B2

(12) United States Patent
Takahashi et al.

(10) Patent No.: US 10,787,934 B2
(45) Date of Patent: Sep. 29, 2020

(54) STEAM TURBINE PLANT

(71) Applicant: Mitsubishi Hitachi Power Systems, Ltd., Kanagawa (JP)

(72) Inventors: Ryota Takahashi, Kanagawa (JP); Issaku Fujita, Kanagawa (JP); Kentaro Tanaka, Kanagawa (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 13 days.

(21) Appl. No.: 16/097,978

(22) PCT Filed: Apr. 17, 2017

(86) PCT No.: PCT/JP2017/015462
§ 371 (c)(1),
(2) Date: Oct. 31, 2018

(87) PCT Pub. No.: WO2017/199660
PCT Pub. Date: Nov. 23, 2017

(65) Prior Publication Data
US 2019/0145285 A1    May 16, 2019

(30) Foreign Application Priority Data

May 20, 2016  (JP) .................................. 2016-101608

(51) Int. Cl.
*F01K 7/12*    (2006.01)
*F01K 7/38*    (2006.01)
(Continued)

(52) U.S. Cl.
CPC ................ *F01K 7/12* (2013.01); *F01D 25/32* (2013.01); *F01K 7/22* (2013.01); *F01K 7/223* (2013.01);
(Continued)

(58) Field of Classification Search
CPC .......... F01K 17/025; F01K 7/16; F01K 19/10; F02C 7/224; F02C 6/18; F05D 2260/20;
(Continued)

(56) References Cited

U.S. PATENT DOCUMENTS 8,839,621 B2 *  9/2014  Ferguson ................ F02C 1/007
                                                    60/641.1
9,458,739 B2 * 10/2016  Goto ......................... F01K 7/22
                                                    60/641.1
(Continued)

FOREIGN PATENT DOCUMENTS

CN     101908386     12/2010
JP     60-73397      4/1985
(Continued)

OTHER PUBLICATIONS

Extended European Search Report dated Apr. 8, 2019 in European Application No. 17799092.6.
(Continued)

*Primary Examiner* — Shafiq Mian
(74) *Attorney, Agent, or Firm* — Wenderoth, Lind & Ponack, L.L.P.

(57) ABSTRACT

A steam turbine plant includes a high-medium pressure turbine having a high-pressure turbine section provided at one end portion in an axial direction and a medium-pressure turbine section provided at the other end portion; a low-pressure turbine disposed coaxially with the high-medium pressure turbine; a condenser configured to cool steam used in the low-pressure turbine to condense the steam into condensate; and a feed-water heater configured to heat the condensate with steam discharged from the high-pressure turbine section. The plant also includes a low-pressure moisture separating and heating device configured to remove moisture of steam discharged from the medium-pressure turbine section, and to heat the steam with a part of steam to be sent to an inlet portion of the high-pressure turbine section and a part of steam to be sent to an inlet portion of the medium-pressure turbine section from an outlet portion of the high-pressure turbine section.

3 Claims, 3 Drawing Sheets

(51) Int. Cl.
*F01D 25/32* (2006.01)
*F01K 7/22* (2006.01)
*F22B 37/26* (2006.01)
*F22D 1/32* (2006.01)
*F22D 11/06* (2006.01)
*F01K 9/00* (2006.01)

(52) U.S. Cl.
CPC .............. *F01K 7/38* (2013.01); *F22B 37/266* (2013.01); *F22B 37/268* (2013.01); *F22D 1/32* (2013.01); *F22D 1/325* (2013.01); *F22D 11/06* (2013.01); *F01K 9/00* (2013.01)

(58) Field of Classification Search
CPC ............ F05D 2220/32; F05D 2220/60; F05D 2220/72
See application file for complete search history.

(56) References Cited

U.S. PATENT DOCUMENTS

| | | | | |
|---|---|---|---|---|
| 9,709,261 | B2 * | 7/2017 | Inoue | ......................... F22D 5/26 60/648 |
| 2003/0043952 | A1 | 3/2003 | Itou et al. | |
| 2010/0326074 | A1 * | 12/2010 | Okita | ................. B01D 53/1425 60/648 |
| 2012/0137687 | A1 | 6/2012 | Maruyama | |
| 2012/0256420 | A1 * | 10/2012 | Jourdain | ................. F01K 3/181 60/648 |
| 2015/0033742 | A1 | 2/2015 | Herrazti Garcia et al. | |
| 2015/0218970 | A1 | 8/2015 | Ahn | |
| 2017/0002799 | A1 * | 1/2017 | Mishima | ................... F01K 3/06 60/648 |
| 2018/0328231 | A1 * | 11/2018 | Nagai | ..................... F01K 9/023 60/648 |

FOREIGN PATENT DOCUMENTS

| | | |
|---|---|---|
| JP | 62-218606 | 9/1987 |
| JP | 2003-074309 | 3/2003 |
| JP | 2010-275925 | 12/2010 |
| JP | 2011-185165 | 9/2011 |
| JP | 2012-122357 | 6/2012 |

OTHER PUBLICATIONS

International Search report dated May 30, 2017 in International (PCT) Application No. PCT/JP2017/015462.

Written Opinion of the International Searching authority dated May 30, 2017 in International (PCT) Application No. PCT/JP2017/015462 with English translation.

* cited by examiner

STEAM TURBINE PLANT

TECHNICAL FIELD

The present invention relates to a steam turbine plant which is used in a nuclear power generation plant, a thermal power generation plant, or the like.

BACKGROUND ART

For example, a nuclear power generation plant performs power generation by sending steam generated in a steam generator to a steam turbine and driving a power generator connected thereto. In general, the steam turbine is composed of a high-pressure turbine, a medium-pressure turbine, and a low-pressure turbine, and the steam used in the high-pressure turbine is heated after moisture is removed by a high-pressure moisture separating and heating device, and then sent to the medium-pressure turbine, and the steam used in the medium-pressure turbine is heated after moisture is removed by a low-pressure moisture separating and heating device, and then sent to the low-pressure turbine. Then, the steam used in the steam turbine is cooled in a condenser to become condensate, and the condensate is heated in a low-pressure feed-water heater, a high-pressure feed-water heater, or the like, and then returned to the steam generator.

As such a nuclear power generation plant, for example, there is a nuclear power generation plant described in Japanese Unexamined Patent Application Publication No. 62-218606.

CITATION LIST

In the nuclear power generation plant of the related art, the high-pressure feed-water heater heats the condensate discharged from the condenser by steam heated after moisture is removed by the high-pressure moisture separating and heating device, or steam extracted from the medium-pressure turbine. For this reason, in a case where the steam from the high-pressure moisture separating and heating device is used, a pressure loss in the high-pressure moisture separating and heating device increases, and as a result, effective utilization of steam for heating the condensate is not made.

SUMMARY OF THE INVENTION

The present invention is to solve the above-mentioned problem and has an object to provide a steam turbine plant in which a heat loss is reduced, so that improvement in performance is attained.

Solution to Problem

In order to achieve the above object, according to an aspect of the present invention, there is provided a steam turbine plant including: a high-medium pressure turbine having a high-pressure turbine section provided at one end portion in an axial direction and a medium-pressure turbine section provided at the other end portion; a low-pressure turbine that is disposed coaxially with the high-medium pressure turbine; a condenser that cools steam used in the low-pressure turbine to condense the steam into condensate; and a feed-water heater that heats the condensate with steam discharged from the high-pressure turbine section.

Therefore, steam is supplied in the order of the high-pressure turbine section, the medium-pressure turbine section, and the low-pressure turbine to drive each turbine, the steam used in the low-pressure turbine is cooled and condensed in the condenser to become condensate, and the condensate is heated in the feed-water heater to become steam. At this time, the feed-water heater heats the condensate with the steam which is directly supplied thereto by being discharged from the high-pressure turbine section, and therefore, effective utilization of steam can be attained, and a heat loss is reduced, so that improvement in performance can be attained.

In the steam turbine plant according to the aspect of the present invention, a plurality of the feed-water heaters are disposed in series along a flow direction of the condensate, and the feed-water heater that is disposed on the most downstream side in the flow direction of the condensate heats the condensate with the steam discharged from the high-pressure turbine section.

Therefore, since the steam from the high-pressure turbine section is sent to the feed-water heater on the most downstream side and the feed-water heater heats the condensate with the steam from the high-pressure turbine section, the condensate which is heated with steam in the feed-water heater can be effectively heated to a desired temperature.

In the steam turbine plant according to the aspect of the present invention, the feed-water heater includes a low-pressure feed-water heater and a high-pressure feed-water heater that are disposed in series along the flow direction of the condensate, and the high-pressure feed-water heater heats the condensate with the steam discharged from the high-pressure turbine section.

Therefore, since the steam from the high-pressure turbine section is sent to the high-pressure feed-water heater on the downstream side and the high-pressure feed-water heater heats the condensate with the steam from the high-pressure turbine section, the condensate which is heated with steam in the high-pressure feed-water heater can be effectively heated to a desired temperature.

In the steam turbine plant according to the aspect of the present invention, a low-pressure moisture separating and heating device that removes moisture of steam discharged from the medium-pressure turbine section and performs heating with the steam discharged from the high-pressure turbine section is provided.

Therefore, the low-pressure moisture separating and heating device removes moisture of the steam discharged from the medium-pressure turbine section and performs heating with the steam discharged from the high-pressure turbine section, and therefore, more effective utilization of steam can be attained, and thus a heat loss can be reduced.

Advantageous Effects of Invention

According to the steam turbine plant of the present invention, the feed-water heater that heats the condensate with the steam discharged from the high-pressure turbine section is provided, and therefore, effective utilization of steam can be attained, and a heat loss is reduced, so that improvement in performance can be attained.

DESCRIPTION OF EMBODIMENTS

Hereinafter, preferred embodiments of a steam turbine plant according to the present invention will be described in detail with reference to the accompanying drawings. The present invention is not limited by the embodiments, and in a case where there are a plurality of embodiments, the present invention also includes a configuration made by combining the respective embodiments.

First Embodiment

Figure 1:
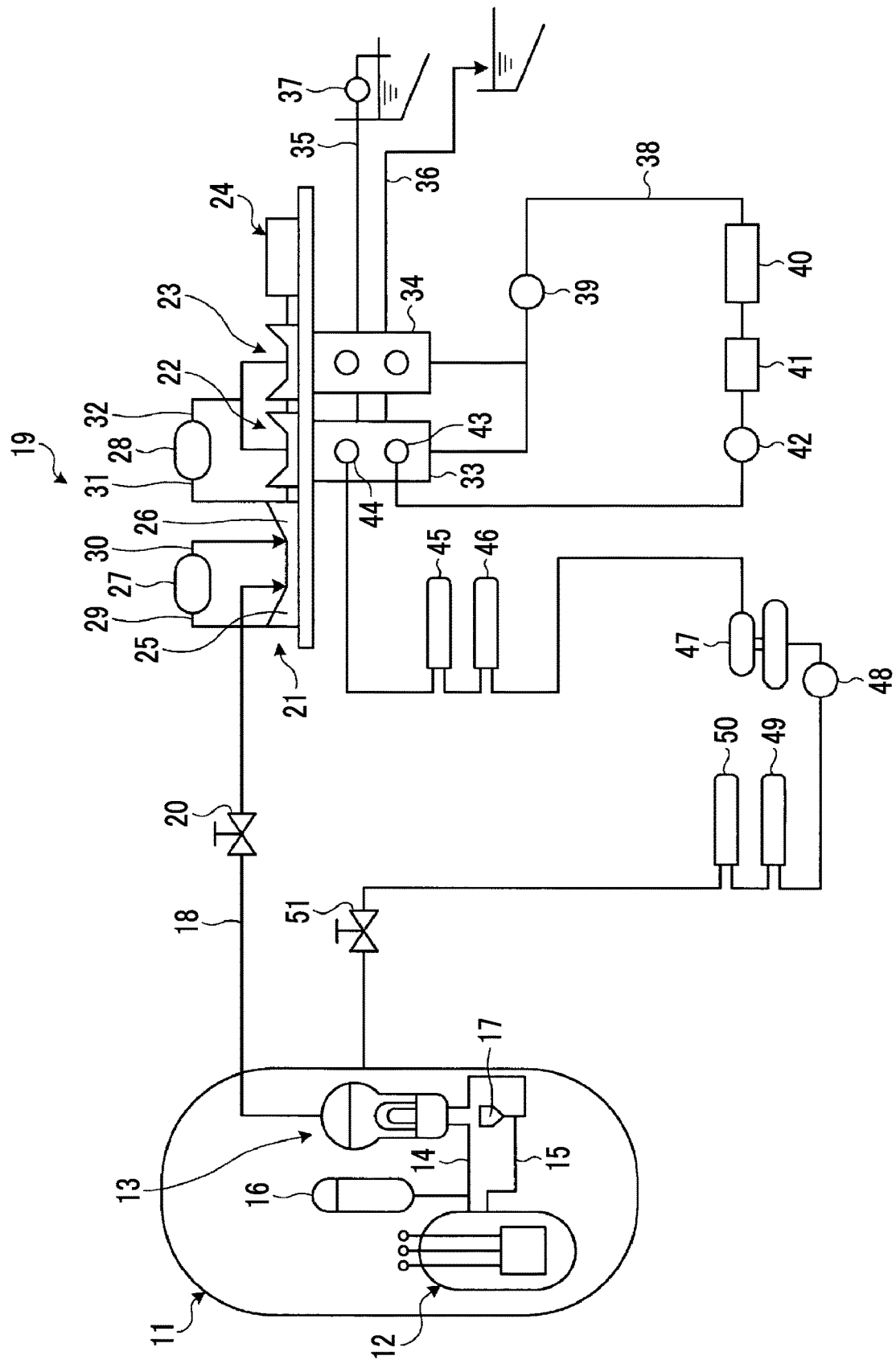
FIG. 1 is a schematic configuration diagram showing a nuclear power generation plant of a first embodiment.

FIG. 1 is a schematic configuration diagram showing a nuclear power generation plant of a first embodiment.

A nuclear reactor of the first embodiment is a pressurized water reactor (PWR) which uses light water as a nuclear reactor coolant and a neutron moderator to generate high-temperature and high-pressure water which does not boil over the entire core, generates steam by heat exchange by sending the high-temperature and high-pressure water to a steam generator, and sends the steam to a turbine generator to generate electric power.

In the nuclear power generation plant having the pressurized water reactor of the first embodiment, as shown in FIG. 1, a pressurized water reactor 12 and a steam generator 13 are housed in a reactor containment vessel 11, the pressurized water reactor 12 and the steam generator 13 are connected to each other through pipes 14 and 15, a pressurizer 16 is provided in the pipe 14, and a primary cooling water pump 17 is provided in the pipe 15. In this case, light water is used as a moderator and a primary cooling water (coolant), and in order to suppress boiling of the primary cooling water in a core part, a primary cooling system is controlled by the pressurizer 16 so as to maintain a high-pressure state in a range of about 150 to 160 atmospheres. Therefore, in the pressurized water reactor 12, the light water as the primary cooling water is heated by low-enriched uranium or MOX as fuel (nuclear fuel), and high-temperature primary cooling water is sent to the steam generator 13 through the pipe 14 in a state of being maintained at a predetermined high-pressure by the pressurizer 16. In the steam generator 13, heat exchange is performed between the high-temperature and high-pressure primary cooling water and secondary cooling water, and the cooled primary cooling water is returned to the pressurized water reactor 12 through the pipe 15.

The steam generator 13 is connected to a steam turbine 19 through a steam pipe 18, and a main steam isolation valve 20 is provided in the steam pipe 18. The steam turbine 19 includes a high-medium pressure turbine 21 and two low-pressure turbines 22 and 23, and a power generator 24 is coaxially connected thereto. The high-medium pressure turbine 21 includes a high-pressure turbine section 25 and a medium-pressure turbine section 26, and a high-pressure moisture separating and heating device 27 is provided between the high-pressure turbine section 25 and the medium-pressure turbine section 26. Further, a low-pressure moisture separating and heating device 28 is provided between the high-medium pressure turbine 21 (the medium-pressure turbine section 26) and the low-pressure turbines 22 and 23. That is, the steam pipe 18 from the steam generator 13 is connected to an inlet portion of the high-pressure turbine section 25, a steam pipe 29 is connected from an outlet portion of the high-pressure turbine section 25 to an inlet portion of the high-pressure moisture separating and heating device 27, and a steam pipe 30 is connected from an outlet portion of the high-pressure moisture separating and heating device 27 to an inlet portion of the medium-pressure turbine section 26. Further, a steam pipe 31 is connected from an outlet portion of the medium-pressure turbine section 26 to an inlet portion of the low-pressure moisture separating and heating device 28, and a steam pipe 32 is connected from an outlet portion of the low-pressure moisture separating and heating device 28 to an inlet portion of each of the low-pressure turbines 22 and 23.

In the steam turbine 19, condensers 33 and 34 are provided below the low-pressure turbines 22 and 23. The condensers 33 and 34 cool the steam used in the low-pressure turbines 22 and 23 with cooling water to condense the steam into condensate. As this cooling water, seawater is used, and a water intake pipe 35 and a water discharge pipe 36 for supplying and discharging the cooling water are connected to the condensers 33 and 34. The water intake pipe 35 has a circulating water pump 37, and the other end portion thereof is disposed in the sea together with the water discharge pipe 36.

A feed-water pipe 38 is connected to the condensers 33 and 34, and in the feed-water pipe 38, a condensate pump 39, a grand condenser 40, a condensate demineralizer 41, a condensate booster pump 42, low-pressure feed-water heaters 43, 44, 45, and 46 are provided in order along a flow direction of the condensate. Here, the first low-pressure feed-water heater 43 and the second low-pressure feed-water heater 44 are provided in the condensers 33 and 34, and the condensate is heated with the steam used in the low-pressure turbines 22 and 23. Further, the third low-pressure feed-water heater 45 and the fourth low-pressure feed-water heater 46 are provided outside the condensers 33 and 34, and in the third low-pressure feed-water heater 45 and the fourth low-pressure feed-water heater 46, the condensate is heated with the steam extracted from the low-pressure turbines 22 and 23.

Further, in the feed-water pipe 38, a deaerator 47, a main feed-water pump 48, high-pressure feed-water heaters 49 and 50, and a main feed-water control valve 51 are provided in order along the flow direction of the condensate on further the downstream side with respect to the fourth low-pressure feed-water heater 46.

For this reason, the steam generated by performing heat exchange with the high-temperature and high-pressure primary cooling water by the steam generator 13 is sent to the steam turbine 19 through the steam pipe 18, so that the high-medium pressure turbine 21 and the low-pressure turbines 22 and 23 are operated, thereby obtaining a rotational force, and the power generator 24 is driven with the rotational force to perform power generation. At this time, the steam from the steam generator 13 drives the high-pressure turbine section 25. Thereafter, moisture contained in the steam is removed and the steam is heated by the high-pressure moisture separating and heating device 27, and then the steam drives the medium-pressure turbine section 26. Further, the steam which has driven the medium-pressure turbine section 26 drives the low-pressure turbines 22 and 23 after moisture contained in the steam is removed and also the steam is heated by the low-pressure moisture separating and heating device 28. Then, the steam which has driven the low-pressure turbines 22 and 23 is cooled by using seawater in the condensers 33 and 34 to become condensate, and the condensate is made to flow through the feed-water pipe 38 by the condensate pump 39, and returned to the steam generator 13 through the grand condenser 40, the condensate demineralizer 41, the low-pressure feed-water heaters 43, 44, 45, and 46, the deaerator 47, the high-pressure feed-water heaters 49 and 50, and the like.

Figure 2:
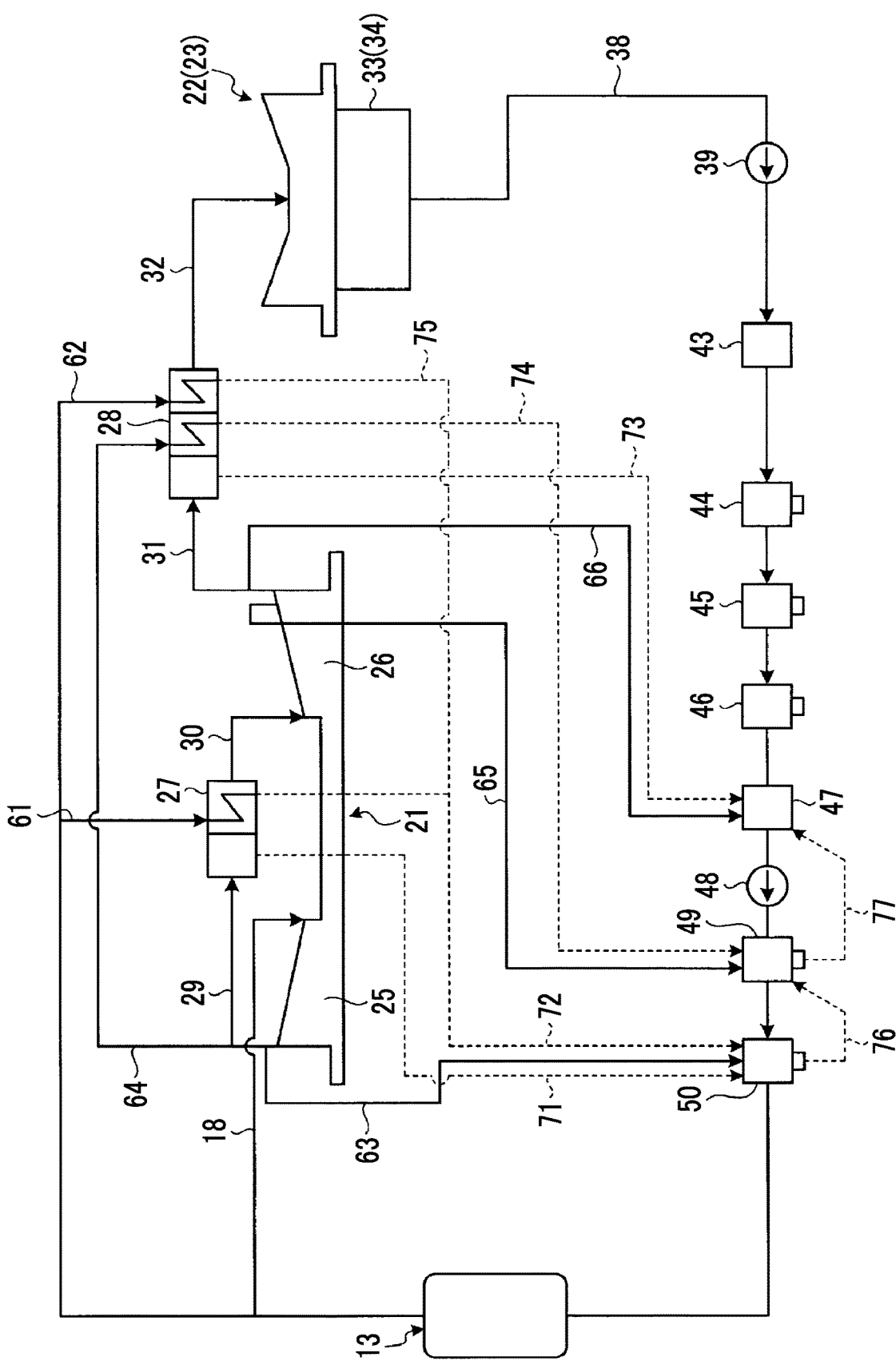
FIG. 2 is a schematic diagram showing flows of condensate and steam in a steam turbine plant of the first embodiment.

Here, the flows of the condensate and the steam in the high-medium pressure turbine 21, the low-pressure turbines 22 and 23, the high-pressure moisture separating and heating device 27, the low-pressure moisture separating and heating device 28, the high-pressure feed-water heaters 49 and 50, and the like will be described. FIG. 2 is a schematic diagram showing the flows of the condensate and the steam in the steam turbine plant of the first embodiment.

As shown in FIG. 2, a base end portion of the steam pipe 18 is connected to the steam generator 13, and a tip portion thereof is connected to an inlet portion of the high-pressure turbine section 25 in the high-medium pressure turbine 21. A base end portion of the steam pipe (a first steam line) 29 is connected to an outlet portion of the high-pressure turbine section 25, and a tip portion thereof is connected to an inlet portion of the high-pressure moisture separating and heating device 27. A base end portion of the steam pipe 30 is connected to an outlet portion of the high-pressure moisture separating and heating device 27, and a tip portion thereof is connected to an inlet portion of the medium-pressure turbine section 26. A base end portion of the steam pipe 31 is connected to an outlet portion of the medium-pressure turbine section 26, and a tip portion thereof is connected to an inlet portion of the low-pressure moisture separating and heating device 28. A base end portion of the steam pipe 32 is connected to an outlet portion of the low-pressure moisture separating and heating device 28, and a tip portion thereof is connected to an inlet portion of each of the low-pressure turbines 22 and 23.

Further, a base end portion of the feed-water pipe 38 is connected to outlet portions of the condensers 33 and 34, and a tip portion thereof is connected to the steam generator 13. In the feed-water pipe 38, the condensate pump 39, the low-pressure feed-water heaters 43, 44, 45, and 46, the deaerator 47, the main feed-water pump 48, and the high-pressure feed-water heaters 49 and 50 are disposed along the flow direction of feed-water (condensate).

Steam pipes 61 and 62 branch off from the steam pipe 18, the steam pipe 61 is connected to the high-pressure moisture separating and heating device 27, and the steam pipe 62 is connected to the low-pressure moisture separating and heating device 28. The high-pressure moisture separating and heating device 27 heats the steam discharged from the high-pressure turbine section 25 and sent thereto by the steam pipe 29 by using the steam sent from the steam generator 13 through the steam pipe 61 as a heating source. Further, the low-pressure moisture separating and heating device 28 heats the steam discharged from the medium-pressure turbine section 26 and sent thereto by the steam pipe 31 by using the steam sent from the steam generator 13 through the steam pipe 62 as a heating source.

Two steam pipes (a second steam line and a third steam line) 63 and 64 branch off from the 29. The steam pipe 63 is connected to the second high-pressure feed-water heater 50, and the steam pipe 64 is connected to the low-pressure moisture separating and heating device 28. The second high-pressure feed-water heater 50 heats the feed-water that is sent to the steam generator 13 through the feed-water pipe 38 by using the steam discharged from the high-pressure turbine section 25 and sent thereto by the steam pipe 63 as a heating source. Further, the low-pressure moisture separating and heating device 28 heats the steam discharged from the medium-pressure turbine section 26 and sent thereto by the steam pipe 31 by using the steam discharged from the high-pressure turbine section 25 and sent thereto by the steam pipe 64 as a heating source.

A base end portion of a steam pipe 65 is connected to the medium-pressure turbine section 26, and a tip portion of the steam pipe 65 is connected to the first high-pressure feed-water heater 49. The first high-pressure feed-water heater 49 heats the feed-water that is sent to the steam generator 13 through the feed-water pipe 38 by using the steam extracted from the medium-pressure turbine section 26 and sent thereto by the steam pipe 65 as a heating source. A Steam pipe 66 branches off from the steam pipe 31, and the steam pipe 66 is connected to the deaerator 47. The deaerator 47 heats the feed-water flowing through the feed-water pipe 38 by using the steam discharged from the medium-pressure turbine section 26 and sent thereto by the steam pipe 66 as a heating source. That is, the deaerator 47 removes impurities such as dissolved oxygen or uncondensed gas (ammonia gas) from the condensate while heating the condensate with the steam discharged from the medium-pressure turbine section 26.

Further, in each of the moisture separating and heating devices 27 and 28, drainage (water) is generated because the steam is cooled and condensed. For this reason, drain pipes 71 and 72 are connected to the high-pressure moisture separating and heating device 27, and each of the drain pipes 71 and 72 is connected to the second high-pressure feed-water heater 50. Drain pipes 73, 74, and 75 are connected to the low-pressure moisture separating and heating device 28. Further, the drain pipe 73 is connected to the deaerator 47, the drain pipe 74 is connected to the first high-pressure feed-water heater 49, and the drain pipe 75 is connected to the second high-pressure feed-water heater 50.

Further, in each of the high-pressure feed-water heaters 49 and 50, drainage (water) is generated because the steam heats the condensate and is condensed. For this reason, a drain pipe 76 is connected from the second high-pressure feed-water heater 50 to the first high-pressure feed-water heater 49, and a drain pipe 77 is connected from the first high-pressure feed-water heater 49 to the deaerator 47.

Although not shown in the drawings, each of the low-pressure feed-water heaters 43, 44, 45, and 46 heats the feed-water flowing through the feed-water pipe 38 by using the steam extracted from the low-pressure turbines 22 and 23 as a heating source. Further, in each of the low-pressure feed-water heaters 43, 44, 45, and 46, drainage (water) is generated because the steam heats the condensate and is condensed. Therefore, a drain pipe (not shown) is provided, and the recovered drainage is sent to the feed-water pipe 38 by a drain pump.

For this reason, the steam which is sent from the steam generator 13 through the steam pipe 18 is sent to the high-medium pressure turbine 21, thereby driving the high-pressure turbine section 25, and then sent to the high-pressure moisture separating and heating device 27 by the steam pipe 29. The high-pressure moisture separating and heating device 27 removes moisture from the steam discharged from the high-pressure turbine section 25 and then performs heating with the steam sent from the steam pipe 61. The steam treated in the high-pressure moisture separating and heating device 27 is sent to the medium-pressure turbine section 26 by the steam pipe 30 to drive the medium-pressure turbine section 26, and then sent to the low-pressure moisture separating and heating device 28 by the steam pipe 31. The low-pressure moisture separating and heating device 28 removes moisture from the steam discharged from the medium-pressure turbine section 26 and then performs heating with the steam sent from the steam pipe 62 and 64. The steam treated in the low-pressure moisture separating and heating device 28 is sent to the low-pressure turbines 22 and 23 by the steam pipe 32 to drive the low-pressure turbines 22 and 23.

At this time, the steam extracted from the medium-pressure turbine section 26 is sent to the first high-pressure feed-water heater 49 by the steam pipe 65 to heat the feed-water flowing through the feed-water pipe 38. Further, the steam exhausted from the high-pressure turbine section 25 is sent to the second high-pressure feed-water heater 50 by the steam pipe 63 to heat the feed-water flowing through the feed-water pipe 38. That is, most (about 90%) of the steam exhausted from the high-pressure turbine section 25 is sent to the high-pressure moisture separating and heating device 27 by the steam pipe 29, a part (about 5%) of the steam is sent to the low-pressure moisture separating and heating device 28 by the steam pipe 64, and a part (about 5%) of the steam is sent to the second high-pressure feed-water heater 50 by the steam pipe 63. For this reason, the amount of steam which is sent to the high-pressure moisture separating and heating device 27 decreases, a pressure loss in the high-pressure moisture separating and heating device 27 is reduced, and downsizing of the high-pressure moisture separating and heating device 27 becomes possible. Further, it is not necessary to secure a structure for extracting steam into the high-pressure turbine section 25, and thus it is possible to prevent complication of the configuration.

In this manner, in the steam turbine plant of the first embodiment, the high-medium pressure turbine 21 having the high-pressure turbine section 25 provided at one end portion in an axial direction and the medium-pressure turbine section 26 provided at the other end portion, the low-pressure turbines 22 and 23 which are disposed coaxially with the high-medium pressure turbine 21, the condensers 33 and 34 which cool the steam used in the low-pressure turbines 22 and 23 to condense the steam into condensate, and the second high-pressure feed-water heater 50 which heats the condensate with the steam discharged from the high-pressure turbine section 25 are provided.

Therefore, the steam from the steam generator 13 is sent from the high-pressure turbine section 25 and the medium-pressure turbine section 26 of the high-medium pressure turbine 21 to the low-pressure turbines 22 and 23 to drive the low-pressure turbines 22 and 23, the steam used in the low-pressure turbines 22 and 23 is cooled and condensed in the condensers 33 and 34 to become condensate, the condensate is heated in the low-pressure feed-water heaters 43, 44, 45, and 46 and the high-pressure feed-water heaters 49 and 50 to become steam, and the steam is returned to the steam generator 13. At this time, the second high-pressure feed-water heater 50 heats the condensate with the high-temperature and high-pressure steam which is directly supplied thereto by being discharged from the high-pressure turbine section 25, and therefore, the steam which is returned to the steam generator 13 can be heated to a desired temperature, effective utilization of steam can be attained, and a heat loss is reduced, so that improvement in performance can be attained.

In the steam turbine plant of the first embodiment, the condensate is heated with the steam discharged from the high-pressure turbine section 25 in the second high-pressure feed-water heater 50 disposed on the most downstream side in the flow direction of the condensate. Therefore, the feed-water (the condensate) which is heated with steam in the second high-pressure feed-water heater 50 can be efficiently heated to a desired temperature.

In the steam turbine plant of the first embodiment, the second high-pressure feed-water heater 50 which is disposed on the most downstream side in the flow direction of the condensate heats the condensate with the steam discharged from the high-pressure turbine section 25, and the first high-pressure feed-water heater 49 which is disposed on the front side of the most downstream portion in the flow direction of the condensate heats the condensate with the steam extracted from the medium-pressure turbine section 26. Therefore, the condensate which is heated with steam in each of the high-pressure feed-water heaters 49 and 50 can be efficiently heated to a desired temperature.

In the steam turbine plant of the first embodiment, the deaerator 47 which removes impurities from the condensate is disposed between the fourth low-pressure feed-water heater 46 and the first high-pressure feed-water heater 49, and the deaerator 47 heats the condensate with the steam discharged from the medium-pressure turbine section 26. Therefore, the condensate which is heated with the steam in the deaerator 47 can be efficiently heated to a desired temperature.

In the steam turbine plant of the first embodiment, the high-pressure moisture separating and heating device 27 which removes moisture of the steam from the high-pressure turbine section 25, the steam pipe (the first steam line) 29 which sends the steam from the high-pressure turbine section 25 to the high-pressure moisture separating and heating device 27, and the steam pipe (the second steam line) 63 branching off from the steam pipe 29 and sending the steam to the second high-pressure feed-water heater 50 as a heating source are provided. Therefore, the steam pipe 63 branching off from the steam pipe 29 which sends the steam from the high-pressure turbine section 25 to the high-pressure moisture separating and heating device 27 and sends the steam to the second high-pressure feed-water heater 50 is provided. Therefore, the amount of steam which is sent to the high-pressure moisture separating and heating device 27 decreases, a pressure loss in the high-pressure moisture separating and heating device 27 is reduced, improvement in the performance of the high-pressure moisture separating and heating device 27 can be attained, and downsizing of the high-pressure moisture separating and heating device 27 can be attained.

In the steam turbine plant of the first embodiment, the low-pressure moisture separating and heating device 28 which removes moisture of the steam from the medium-pressure turbine section 26, and the steam pipe (the third steam line) 64 branching off from the steam pipe 29 and sending the steam to the low-pressure moisture separating and heating device 28 as a heating source are provided.

Therefore, due to the steam pipe 64 provided to branch off from the steam pipe 29, the amount of steam which is sent to the high-pressure moisture separating and heating device 27 further decreases, a pressure loss in the high-pressure moisture separating and heating device 27 is reduced, improvement in the performance of the high-pressure moisture separating and heating device 27 can be attained, and further downsizing of the high-pressure moisture separating and heating device 27 can be attained.

Second Embodiment

Figure 3:
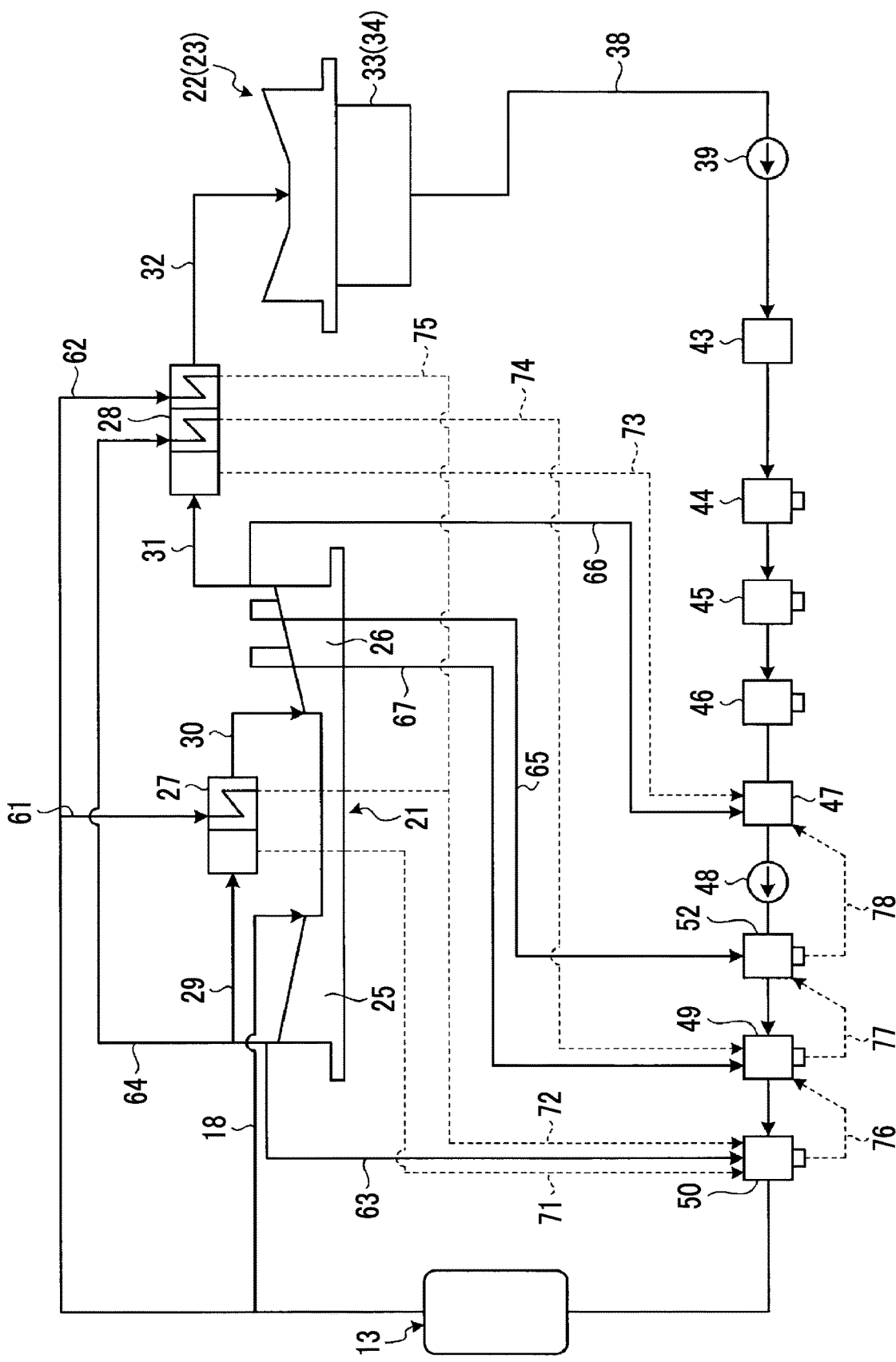
FIG. 3 is a schematic diagram showing flows of condensate and steam in a steam turbine plant of a second embodiment.

FIG. 3 is a schematic diagram showing the flows of condensate and steam in a steam turbine plant of a second embodiment.

In the second embodiment, as shown in FIG. 3, the base end portion of the feed-water pipe 38 is connected to the outlet portions of the condensers 33 and 34, and the tip portion thereof is connected to the steam generator 13. In the feed-water pipe 38, the condensate pump 39, the low-pressure feed-water heaters 43, 44, 45, and 46, the deaerator 47, the main feed-water pump 48, and the high-pressure feed-water heaters 52, 49, and 50 are disposed along the flow direction of the feed-water (the condensate).

The steam pipe 61 branching off from the steam pipe 18 is connected to the high-pressure moisture separating and heating device 27, and the steam pipe 62 is connected to the low-pressure moisture separating and heating device 28. The steam pipe 63 branching off from the steam pipe 29 is connected to the second high-pressure feed-water heater 50, and the steam pipe 64 is connected to the low-pressure moisture separating and heating device 28. The steam pipe 65 for extracting steam from the medium-pressure turbine section 26 is connected to the third high-pressure feed-water heater 52. The steam pipe 66 branching off from the steam pipe 31 is connected to the deaerator 47. Further, a steam pipe 67 for extracting steam from the medium-pressure turbine section 26 is connected to the first high-pressure feed-water heater 49. In this case, the steam pipe 67 extracts steam having higher pressure and higher temperature than that in the steam pipe 65.

The drain pipes 71 and 72 are connected to the high-pressure moisture separating and heating device 27, and each of the drain pipes 71 and 72 is connected to the second high-pressure feed-water heater 50. The drain pipes 73, 74, and 75 are connected to the low-pressure moisture separating and heating device 28. Further, the drain pipe 73 is connected to the deaerator 47, the drain pipe 74 is connected to the first high-pressure feed-water heater 49, and the drain pipe 75 is connected to the second high-pressure feed-water heater 50. Further, the drain pipe 76 is connected from the second high-pressure feed-water heater 50 to the first high-pressure feed-water heater 49, the drain pipe 77 is connected from the first high-pressure feed-water heater 49 to the third high-pressure feed-water heater 52, and a drain pipe 78 is connected from the third high-pressure feed-water heater 52, to the deaerator 47.

The operation of the steam turbine plant of this embodiment is substantially the same as that of the steam turbine plant of the first embodiment described above, and therefore, the description thereof is omitted.

In this manner, in the steam turbine plant of the second embodiment, a plurality of high-pressure feed-water heaters 49, 50, and 52 which heat the feed-water (the condensate) with steam are provided, and the steam discharged from the high-pressure turbine section 25 is supplied to the second high-pressure feed-water heater 50 on the most downstream side.

Therefore, the second high-pressure feed-water heater 50 heats the condensate with the high-temperature and high-pressure steam which is directly supplied thereto by being discharged from the high-pressure turbine section 25, and therefore, the steam which is returned to the steam generator 13 can be heated to a desired temperature, effective utilization of steam can be attained, and a heat loss is reduced, so that improvement in performance can be attained.

In the embodiments described above, two or three high-pressure feed-water heaters 49, 50, and 52 are provided. However, the disposition or the number thereof is not limited to that in each embodiment and may be appropriately set according to the scale or the like of the steam turbine plant.

Further, in the embodiments described above, four low-pressure feed-water heaters 43, 44, 45, and 46 are provided, the two low-pressure feed-water heaters 43 and 44 are disposed in the condensers 33 and 34, and the two low-pressure feed-water heaters 45 and 46 are disposed outside the condensers 33 and 34. However, the disposition or the number thereof is not limited to that in the embodiments and may be appropriately set according to the scale or the like of the steam turbine plant.

Further, in the embodiments described above, the moisture of the discharged steam from the high-pressure turbine section is removed by using the high-pressure moisture separating and heating device 27. However, a moisture separator having no heating function may also be adopted.

Further, in the embodiments described above, the steam turbine plant according to the present invention has been described as applied to a nuclear power generation plant. However, there is no limitation thereto, and it can also be applied to, for example, a thermal power generation plant or the like.

REFERENCE SIGNS LIST

12: pressurized water reactor
13: steam generator
18, 61, 62, 63, 64, 65, 66: steam pipe
19: steam turbine
21: high-medium pressure turbine
22, 23: low-pressure turbine
24: power generator
25: high-pressure turbine section
26: medium-pressure turbine section
27: high-pressure moisture separating and heating device
28: low-pressure moisture separating and heating device
29, 30, 31, 32: steam pipe
33, 34: condenser
38: feed-water pipe
43: first low-pressure feed-water heater
44: second low-pressure feed-water heater
45: third low-pressure feed-water heater
46: fourth low-pressure feed-water heater
47: deaerator
49: first high-pressure feed-water heater
50: second high-pressure feed-water heater
52: third high-pressure feed-water heater
71, 72, 73, 74, 75, 76, 77: drain pipe

The invention claimed is:
1. A steam turbine plant comprising:
   a high-medium pressure turbine having a high-pressure turbine section at a first end portion in an axial direction and a medium-pressure turbine section at a second end portion;
   a low-pressure turbine disposed coaxially with the high-medium pressure turbine;
   a condenser configured to cool steam used in the low-pressure turbine to condense the steam into condensate;
   a feed-water heater configured to heat the condensate with steam discharged from the high-pressure turbine section;
   a high-pressure moisture separating and heating device configured to remove moisture from steam discharged from the high-pressure turbine section, and to heat the steam discharged from the high-pressure turbine section using a part of steam to be sent to an inlet portion of the high-pressure turbine section;
   a low-pressure moisture separating and heating device configured to remove moisture of steam discharged from the medium-pressure turbine section, and to heat the steam discharged from the medium-pressure turbine section using a part of steam to be sent to an inlet portion of the high-pressure turbine section and using a part of steam to be sent to an inlet portion of the high-pressure moisture separating and heating device from an outlet portion of the high-pressure turbine section; and steam pipes configured to send steam discharged from the high-pressure turbine section, from the outlet portion of the high-pressure turbine section to the feed-water heater, the high-pressure moisture separating and heating device, and the low-pressure moisture separating and heating device.

2. The steam turbine plant according to claim 1, wherein a plurality of the feed-water heaters are disposed in series along a flow direction of the condensate, and the feed-water heater that is disposed on the most downstream side in the flow direction of the condensate heats the condensate with the steam discharged from the high-pressure turbine section.

3. The steam turbine plant according to claim 1, wherein the feed-water heater includes a low-pressure feed-water heater and a high-pressure feed-water heater that are disposed in series along the flow direction of the condensate, and the high-pressure feed-water heater heats the condensate with the steam discharged from the high-pressure turbine section.

* * * * *